United States Patent
Gyo

(10) Patent No.: US 6,738,339 B2
(45) Date of Patent: May 18, 2004

(54) LASER DIODE DRIVER, METHOD OF DRIVING THE LASER DIODE DRIVER, AND METHOD OF INITIALIZING AN OPTICAL RECORDING AND REPRODUCING APPARATUS

(75) Inventor: Seo Jin Gyo, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 606 days.

(21) Appl. No.: 09/775,678

(22) Filed: Feb. 5, 2001

(65) Prior Publication Data

US 2001/0043534 A1 Nov. 22, 2001

(30) Foreign Application Priority Data

Feb. 3, 2000 (KR) .......................................... 2000-5487

(51) Int. Cl.[7] ................................................ G11B 7/00
(52) U.S. Cl. ..................................... 369/116; 369/53.26
(58) Field of Search ............................. 369/116, 59.11, 369/53.26, 53.27, 47.5, 47.51, 47.52, 44.31

(56) References Cited

U.S. PATENT DOCUMENTS

| | | | | |
|---|---|---|---|---|
| 4,509,156 A | * | 4/1985 | Ohara et al. ................ | 369/116 |
| 5,040,163 A | * | 8/1991 | Sasaki et al. ............. | 369/53.26 |
| 5,185,734 A | * | 2/1993 | Call et al. ..................... | 369/116 |
| 5,586,098 A | * | 12/1996 | Nishida et al. .............. | 369/116 |
| 5,636,197 A | * | 6/1997 | Tateishi .................... | 369/53.26 |
| 5,715,228 A | * | 2/1998 | Takiguchi ................... | 369/116 |
| 6,246,659 B1 | * | 6/2001 | Suzuki et al. ................ | 369/116 |
| 6,400,673 B1 | * | 6/2002 | Shigemori ................... | 369/116 |

FOREIGN PATENT DOCUMENTS

JP 9-326522 12/1997

* cited by examiner

Primary Examiner—Thang V. Tran
(74) Attorney, Agent, or Firm—Staas & Halsey LLP

(57) ABSTRACT

A laser diode (LD) driver and method, in an optical recording and reproduction apparatus, drives an LD by receiving channel control signals to control power levels of a laser signal from the LD including switches turning on and off driving potentials, each switch corresponding to the power level of the laser signal according to the channel control signals. A multiplexer multiplexes driving potentials and outputs a multiplexed signal. A gate determines an operating mode of the optical recording and reproduction apparatus according to the channel control signals. A variable gain amplifier variably amplifies a monitor signal according to the operating mode determined by the gate and outputs an amplified monitor signal. A sample and hold circuit samples and holds the amplified monitor signal and outputs a signal indicative thereof. An analog multiplexer outputs a reference signal corresponding to the power level of the laser signal according to the operating mode determined by the gate. A differential amplifier calculates a difference between the reference signal and the output signal from the sample and hold circuit. An adder adds the difference and the multiplexed signal and outputs therefrom a driving signal to drive the LD. A high frequency modulator generates a high frequency modulation signal removing the influence of optical interference noise caused by an optical pick-up.

33 Claims, 7 Drawing Sheets

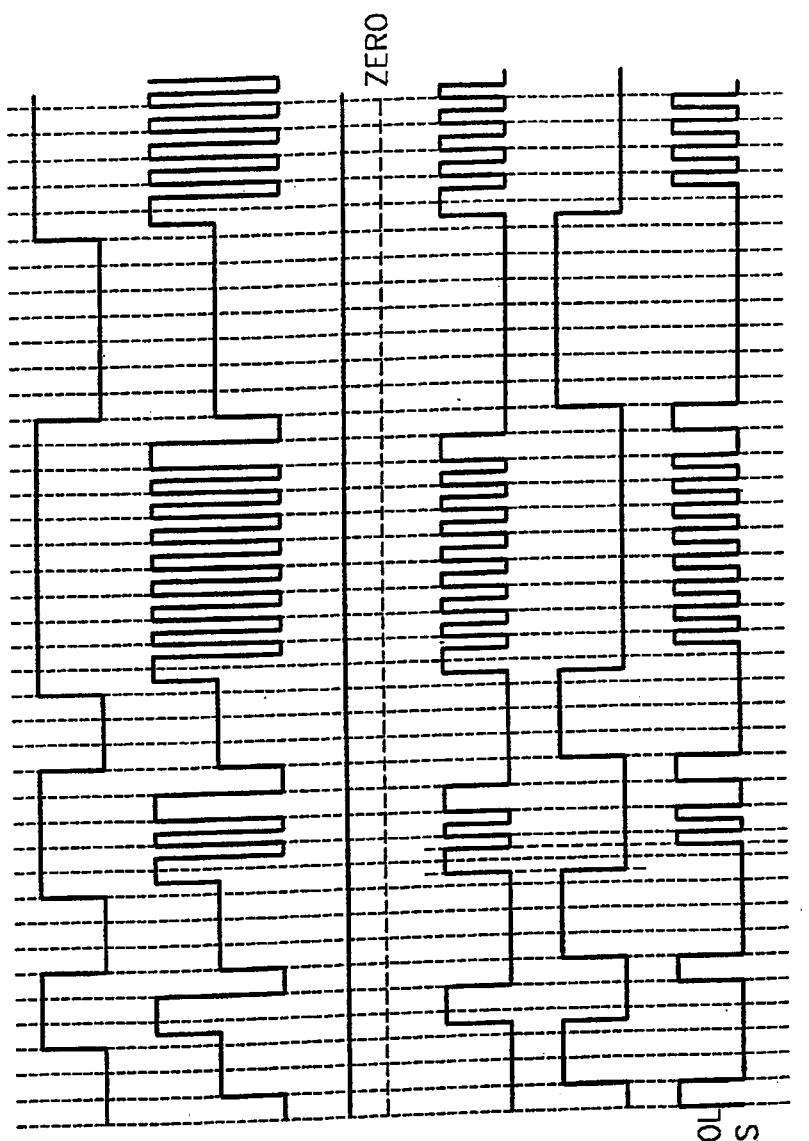

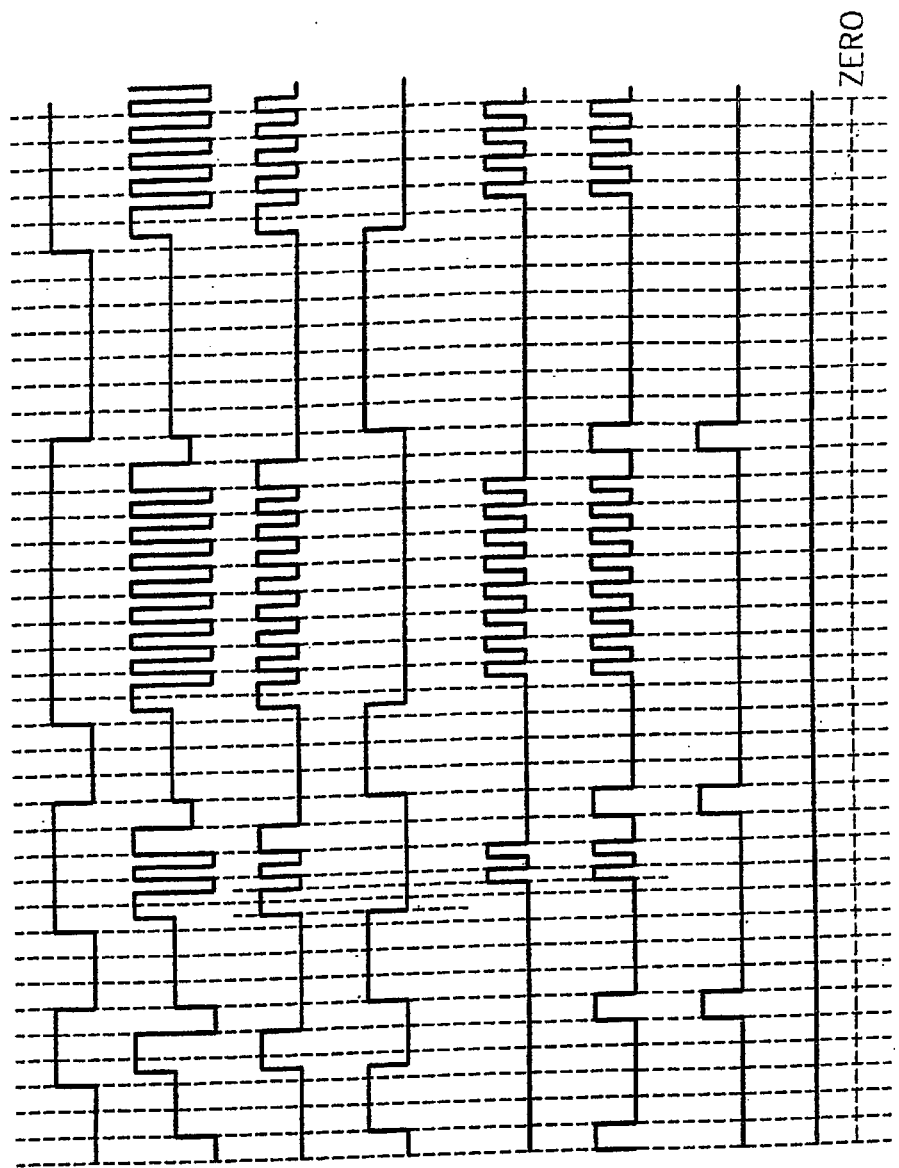

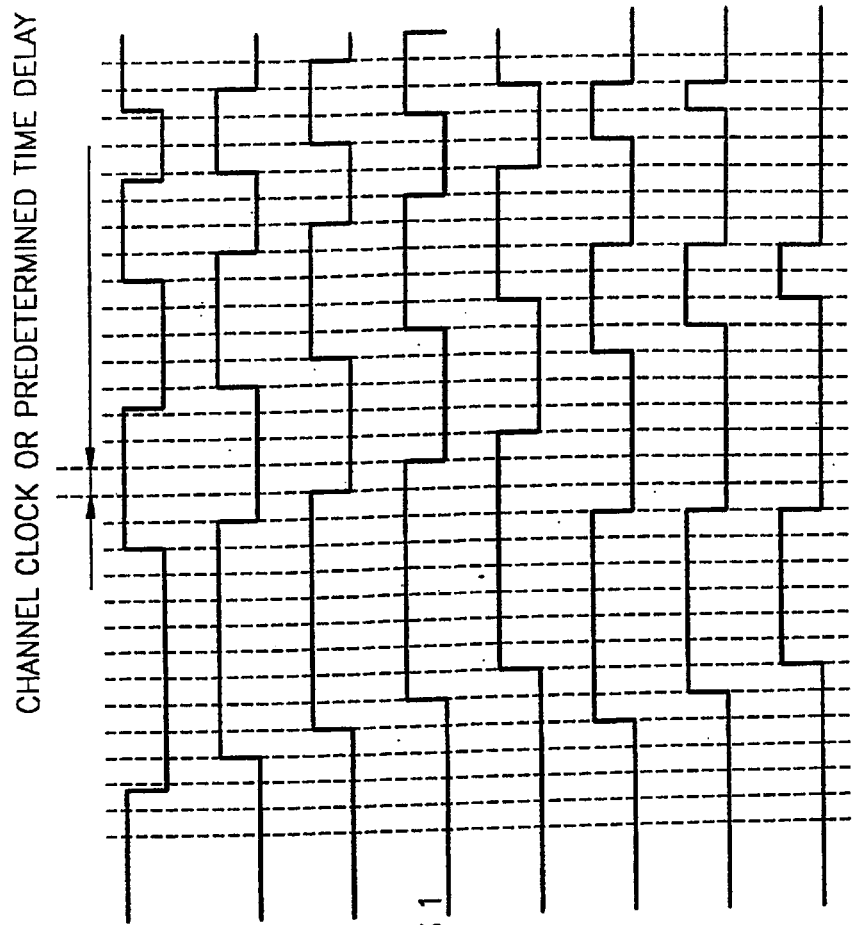

LASER DIODE DRIVER, METHOD OF DRIVING THE LASER DIODE DRIVER, AND METHOD OF INITIALIZING AN OPTICAL RECORDING AND REPRODUCING APPARATUS

BACKGROUND OF THE INVENTION

1. Field of the Invention

The present invention relates to a laser diode (LD) driver for driving an LD in an optical recording and reproducing apparatus, and more particularly, to an apparatus, which has an auto laser power control (ALPC) function and can drive two or more LDs using the LD driver, a method of driving the LD driver, and a method of initializing the optical recording and reproducing apparatus.

2. Description of the Related Art

FIG. 1 illustrates the structure of a laser diode (LD) driver 100 for driving an LD (not shown) currently used in optical recording apparatuses.

The components of the LD driver 100 include switches 10a through 10c, a multiplexer 12 for multiplexing the outputs of the switches 10a through 10c, an amplifier 14 for amplifying the output of the multiplexer 12 with a predetermined degree of amplification, an adder 16, and a high frequency modulator (HFM) 18.

Current such as peak current, bias current, and read current, or voltage correspond to power levels such as peak power level, bias or erase power level, and read power level of the LD, which are applied to the switches 10a through 10c. The power levels are turned on and off by control signals such as peak control, bias control, and read control.

The outputs of the switches 10a through 10c are multiplexed by the multiplexer 12. The output of the multiplexer 12 is applied to a recording medium. Because the LD cannot be fully driven by the output of the multiplexer 12 alone, the output of the multiplexer 12 is amplified through the amplifier 14.

The HFM 18 generates a high frequency modulation signal to remove optical interference noise from an optical pick-up (not shown). The adder 16 adds the high frequency modulation signal to the output of the amplifier 14 and outputs a driving signal to the LD. The LD, in turn, generates a recording signal corresponding to the driving signal from the adder 16. Here, the high frequency modulation signal is set to have the most effective frequency and magnitude for removing the optical interference noise and is primarily used in a read mode. Further, in the LD driver 100, the number of switches may include two to five switches according to the number of channels used (2ch through 5ch), which are the number of driving levels in a recording signal.

The LD changes according to an operating temperature. Specifically, referring to FIG. 2, an output characteristic of TOLD9452MB, which is an LD driver by Toshiba Co., Ltd. is illustrated. Here, when the LD is operating and a constant input current is applied, the operating temperature increases and the optical output decreases. For example, when an input current of 110 mA is applied, the optical output is reduced from 40 mW at 25° C. to about 20 mW at 70° C. The reduction of the optical output causes a recording function to either deteriorate or not be able to be performed.

To improve such reduction, conventional LD drivers use an automatic laser diode power control (ALPC). In the ALPC, the output of the LD is monitored through an additional monitor diode and the change in the output of the LD is fed back. Accordingly, the output of the LD is maintained uniform. However, the ALPC function cannot be realized only by the LD driver, but it must be realized by an additional circuit or an integrated circuit (IC). Accordingly, electromagnetic wave interference may cause mis-operation during an interface operation when supplying the LD output control signal provided by the ALPC to the LD driver. Furthermore, when recording speed increases, the interface operation may not be performed. The waveform of the LD is reduced to either 780 $\mu$m (in the case of a CD), 635 or 650 $\mu$m (in the case of a DVD), or 40 $\mu$m as a result of development of recording technology and increase in capacity. If a recording and reproducing apparatus includes a plurality of LDs, which lower compatibility and share between a recording medium, multiple circuit blocks for the ALPC corresponding to the respective LDs are necessary. Accordingly, a plurality of circuit blocks performing similar operations must be included. This is a big obstacle to making products small, light, and inexpensive.

SUMMARY OF THE INVENTION

Various objects and advantages of the invention will be set forth in part in the description which follows and, in part, will be obvious from the description, or may be learned by practice of the invention.

The present invention is achieved by providing an objective lens for high-density focusing. The objective lens is a single lens having a high numerical aperture (NA). The objective lens is included in an optical pickup that also includes a relatively thin optical disk.

Accordingly, it is an object of the present invention to provide an apparatus and method including switches turning on and off driving potentials, each switch corresponding to the power level of the laser signal according to the channel control signals. A multiplexer multiplexes the driving potentials and outputs a multiplexed signal. A monitor diode monitors the power level of the laser signal and outputs a monitor signal. Further, a sample and hold unit samples and holds the monitor signal and outputs a signal indicative thereof. A differential amplifier calculates a difference between a reference signal corresponding to the power level of the laser signal and the output signal from the sample and hold unit. An adder adds the difference and the multiplexed signal and outputs therefrom a driving signal to drive the LD.

Furthermore, it is another object of the present invention to provide for a method receiving channel control signals to control different power levels of a laser signal from the LD; turning on and off driving potentials corresponding to the power level of the laser signal according to the channel control signals; multiplexing the driving potentials and outputting a multiplexed signal; monitoring the power level of the laser signal and outputting a monitor signal; sampling and holding the monitor signal and outputting a signal indicative thereof; calculating a difference between a reference signal corresponding to the power level of the laser signal and the output signal from the sampling and holding; and adding the difference and the multiplexed signal and outputting therefrom a driving signal to drive the LD.

Furthermore, it is another object of the present invention to provide for a method of driving an LD, including determining a type of a loaded recording medium; and setting driving potentials corresponding to power levels of a laser signal output from the LD according to the determined type of the recording medium.

Furthermore, it is another object of the present invention to provide for a method of compensating for a bias driving potential of an LD driver according to a change in a power level of a laser signal from an LD in a recording mode, including storing the bias driving potential; detecting a change in a bias power level in the laser signal; and compensating the bias driving potential according to the detected change in the bias power level.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The various objects and advantages of the present invention will become apparent and more readily appreciated from the following description of the preferred embodiments, taken in conjunction with the accompanying drawings of which:

FIG. 4A(a) illustrates a waveform of an input NRZI data for recording in a CD-RW;

FIG. 4A(b) illustrates a waveform of a recording waveform (LD output signal) for recording in the CD-RW;

FIG. 4A(c) illustrates a waveform of a read control (active) signal for recording in the CD-RW;

FIG. 4A(d) illustrates a waveform of a peak control signal for recording in the CD-RW;

FIG. 4A(e) illustrates a waveform of a bias1 control signal (erase power) for recording in the CD-RW;

FIG. 4A(f) illustrates a waveform of a bottom (base3) control signal (when four channels are used) for recording in the CD-RW;

FIG. 4B(a) illustrates a waveform of an input NRZI data for recording in a DVD-RAM;

FIG. 4B(b) illustrates a waveform of a recording waveform (LD output signal) for recording in the DVD-RAM;

FIG. 4B(c) illustrates a waveform of a peak control signal (write level) for recording in the DVD-RAM;

FIG. 4B(d) illustrates a waveform of a bias1 control signal (erase level) for recording in the DVD-RAM;

FIG. 4B(e) illustrates a waveform of a bias2 control signal (bottom level) for recording in the DVD-RAM;

FIG. 4B(f) illustrates a waveform of a bias2 control signal and bias3 control signal for recording in the DVD-RAM;

FIG. 4B(g) illustrates a waveform of a bias3 control signal (cooling level) for recording in the DVD-RAM;

FIG. 4B(h) illustrates a waveform of a read control signal (active) for recording in the DVD-RAM;

FIG. 5(a) illustrates a waveform of an example of inputting NRZI describing the sampling operation of the sample and hold circuit in the LD driver of FIG. 3;

FIG. 5(b) illustrates a waveform of bias 1 control signal (example of high active) describing the sampling operation of the sample and hold circuit in the LD driver of FIG. 3;

FIG. 5(c) illustrates a waveform of a primary delay signal of bias 1 describing the sampling operation of the sample and hold circuit in the LD driver of FIG. 3;

FIG. 5(d) illustrates a waveform of a secondary delay signal of bias 1 describing the sampling operation of the sample and hold circuit in the LD driver of FIG. 3;

FIG. 5(e) illustrates a waveform of a tertiary delay signal of bias 1 describing the sampling operation of the sample and hold circuit in the LD driver of FIG. 3;

FIG. 5(f) illustrates a waveform of a sampling and holding signal 1 of bias 1 describing the sampling operation of the sample and hold circuit in the LD driver of FIG. 3;

FIG. 5(g) illustrates a waveform of a sampling and holding signal 2 of bias 1 describing the sampling operation of the sample and hold circuit in the LD driver of FIG. 3;

FIG. 5(h) illustrates a waveform of a sampling and holding signal 3 of bias 1 describing the sampling operation of the sample and hold circuit in the LD driver of FIG. 3.

DESCRIPTION OF THE PREFERRED EMBODIMENTS

Hereinafter, the structure and operation of the present invention will be described in detail with reference to the attached drawings.

Figure 1:
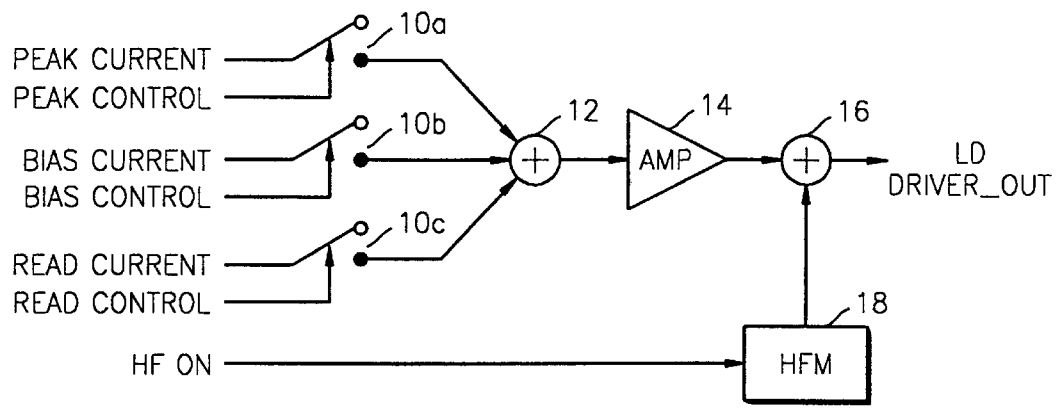
FIG. 1 is a diagram illustrating a structure of a conventional laser diode (LD) driver.
Figure 3:
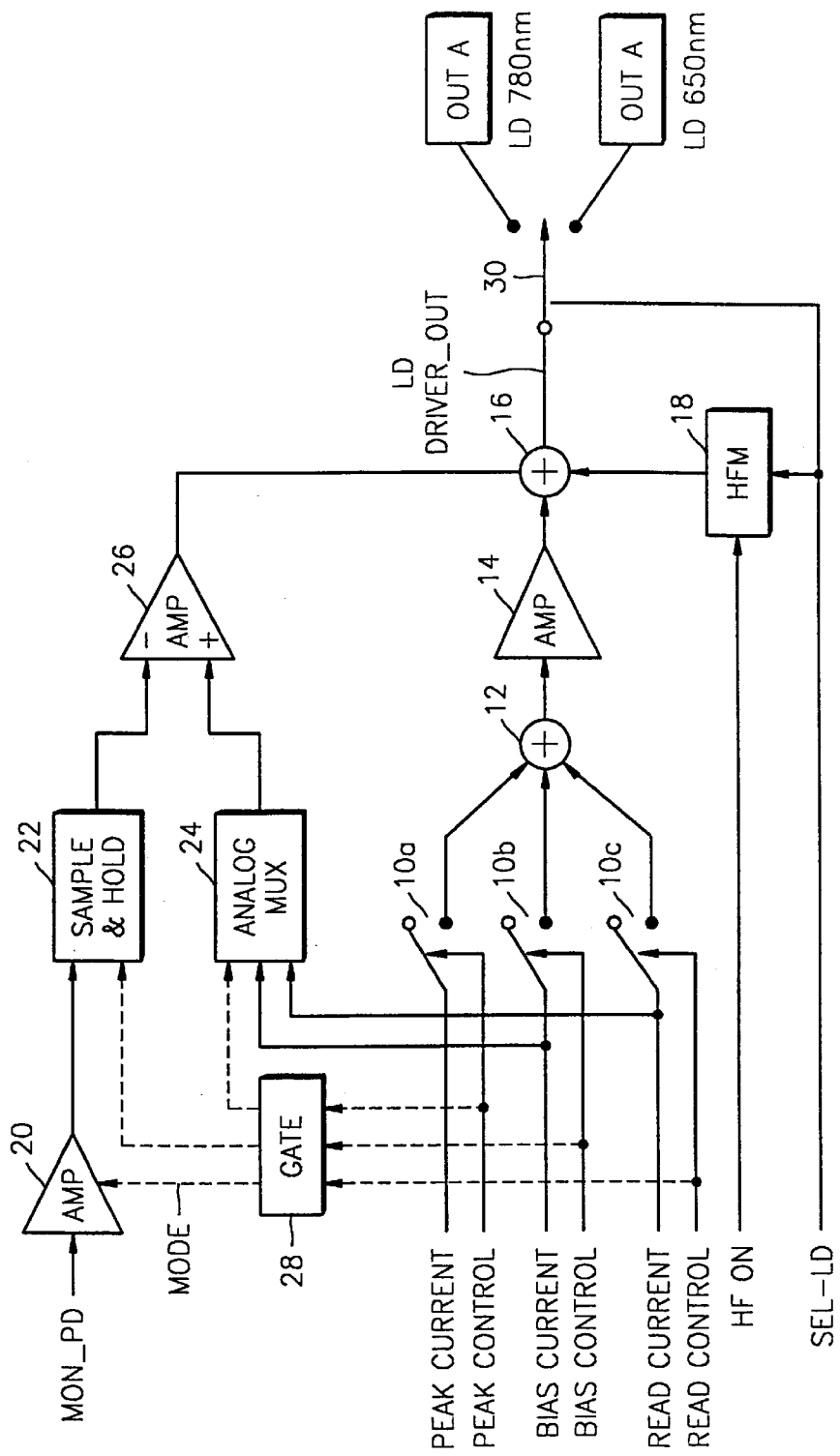
FIG. 3 is a diagram illustrating an LD driver, in accordance with an exemplary embodiment of the present invention.

FIG. 3 is a diagram illustrating a structure of a laser diode (LD) driver 200, in accordance with an exemplary embodiment of the present invention. The components of the LD driver 200 that perform the same operations as the operations performed by the components illustrated in FIG. 1, are denoted with the same reference numerals as the reference numerals of FIG. 1 and the structural and functional description of these components will be omitted.

The LD driver 200 includes a variable gain amplifier 20, a sample and hold circuit 22, an analog multiplexer 24, a differential amplifier 26, a gate 28, and a switch 30. The gate 28 determines an operating mode such as a recording mode or a reproduction mode of an optical recording and reproduction apparatus (not shown). Further, the gate 28 receives channel control signals such as peak control, bias control, and read control, and determines the operating mode of the optical recording and reproduction apparatus. The operating mode of the optical recording and reproduction apparatus can be determined by applying a mode signal from a system control apparatus (not shown). In this case, an input pin (not shown) must be included in the conventional LD driver to receive the mode signal. In order to avoid adding the input pin, the operating mode of the optical recording and reproduction apparatus may be determined by the gate 28 from the channel control signals. The gate 28 determining the operating mode will now be described in detail.

The variable gain amplifier 20 amplifies an output signal MON-PD from a monitor diode (not shown) at different degrees of amplification according to the operating mode of the optical recording and reproduction apparatus. The sample and hold circuit 22 samples and holds the signal output from the variable gain amplifier 20 and provides a sampled and held signal as an inverted input to the differential amplifier 26. The analog multiplexer 24 selects either a bias current or a read current according to the operating mode signal provided by the gate 28 and provides the selected current as a non-inverted input to the differential amplifier 26. The differential amplifier 26 outputs a difference between the inverted input and the non-inverted input. The output of the differential amplifier 26 is applied to an adder 16. The adder 16, in turn, outputs a driving signal, LD DRIVER_OUT to control the LD.

The switch 30 for selecting the LD to be driven is selected by an LD selection signal, SEL-LD, that is set according to the type of a recording medium determined by a system (not shown) at an initial stage of the operation of the optical recording and reproduction apparatus. A high frequency modulator (HFM) 18 outputs different high frequency modulation signals according to the LD to be driven.

The operation of the LD driver will now be described. Current such as, peak current, bias current, and read current, each of which corresponds to a power to be used by the LD such as a peak power level, a bias (or erase) power level, and a read power level, is applied to each of the switches 10a through 10c. The power levels are continuously supplied when the optical recording and reproduction apparatus operates and are turned on and off by the respective control signals such as peak control, bias control, and read control.

FIGS. 4A(a)–(h) illustrate waveforms showing a recording operation in a CD-Read Write (CD-RW). Specifically, FIG. 4A(a) illustrates a waveform of a non-return to zero inverter (NRZI) data. FIG. 4A(b) illustrates a waveform of a recording waveform (LD output signal). FIG. 4A(c) illustrates a waveform of a read control (active) signal. FIG. 4A(d) illustrates a waveform of a peak control signal. FIG. 4A(e) illustrates a waveform of a bias1 control signal (erase power). FIG. 4A(f) illustrates a waveform of a bottom (base3) control signal (when four channels are used).

FIGS. 4B(a)–(h) illustrate waveforms showing the recording operation in a DVD_RAM. Specifically, FIG. 4B(a) illustrates a waveform of an input NRZI data. FIG. 4B(b) illustrates a waveform of a recording waveform (LD output signal). FIG. 4B(c) illustrates a waveform of a peak control signal (write level). FIG. 4B(d) illustrates a waveform of a bias1 control signal (erase level). FIG. 4B(e) illustrates a waveform of a bias2 control signal (bottom level). FIG. 4B(f) illustrates a waveform of a bias2 control signal and bias3 control signal. FIG. 4B(g) illustrates a waveform of a bias3 control signal (cooling level). FIG. 4B(h) illustrates a waveform of a read control signal (active).

Figure 2:
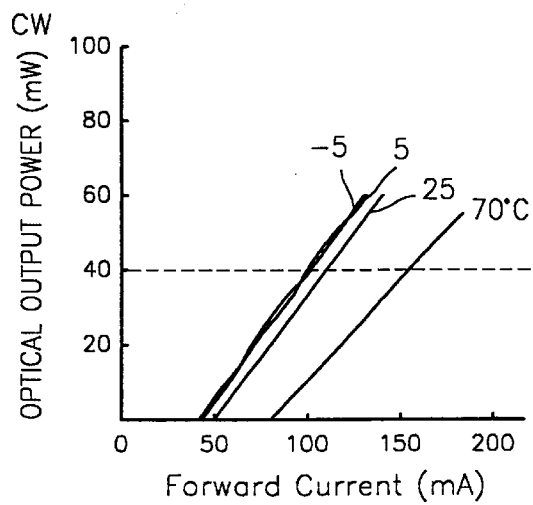
FIG. 2 is a graph illustrating an output characteristic of a LD.

It is possible to obtain a driving signal LD DRIVER_OUT having the same waveform as the waveform of a recording pulse by combining control signals with each other. The driving signal LD DRIVER_OUT is applied to the LD and the recording pulse of FIG. 4B(b) is obtained from the LD. Further, the LD has a temperature-dependent output characteristic as illustrated in FIG. 2. Namely, when the temperature of the LD increases due to an increase in temperature of the LD itself or an increase in external temperature, an optical output is reduced. The change in the optical output according to the change in the temperature of the LD is compensated by a closed loop including the variable gain amplifier 20, the sample and hold circuit 22, the differential amplifier 26, the adder 16, and the LD (not shown).

The output level of the LD is detected by the monitor diode (not shown). The output signal MON-PD of the monitor diode is variably amplified by the variable gain amplifier 20 according to the operating mode of the optical recording and reproduction apparatus and is held by the sample and hold circuit 22. Specifically, the gate 28 receives channel control signals, determines the mode of the optical recording and reproduction apparatus, and provides the mode signal showing the determined mode to the variable gain amplifier 20, the sample and hold circuit 22, and the analog multiplexer 24. The analog multiplexer 24 selects the bias current or the read current according to the operating mode of the optical recording and reproduction apparatus and outputs the selected current. The differential amplifier 26 outputs the difference between the output of the sample and hold circuit 22 and the output of the analog multiplexer 24.

Table 1 illustrates the operating mode determining operation of the gate 28.

TABLE 1

| Read control | Erase control | Write control | Mode | Remarks |
|---|---|---|---|---|
| 0 | x | x | Disable | LD driver disable |
| 1 | 0 | 0 | Reproduction | HFM on |
| 1 | 1 | 0 | Recording | HFM on and and off |
| 1 | 0 | 1 | | HFM off |
| 1 | 1 | 1 | | |

As illustrated in Table 1, the gate 28 determines the optical recording and reproduction apparatus to be in a recording and erase mode when either an erase control signal or a write control signal is active (in the case of "1" in Table 1). In the recording and erase modes, the HFM 18 may be on and/or off. The gate 28 determines the optical recording and reproduction apparatus to be in a reproduction mode when the erase control signal and the write control signal are inactive (in the case of "0" in Table 1) and a read control signal is active. In the reproduction mode, the HFM 18 is on. The gate 28 is determined to be in a disable mode, in which the LD must not be driven, when the read control signal is not active. As illustrated in Table 1, each operating mode is determined by the gate 28; accordingly, the operation characteristics of the variable gain amplifier 20, the sample and hold circuit 22, and the analog amplifier 24 are determined by the gate 28.

In the case of the reading mode, a read gain is set by the variable gain amplifier 20, the sample and hold circuit 22 continuously or periodically operates, and the analog multiplexer 24 selects a read current. In the cases of the recording and erase mode, a write gain is set by the variable gain amplifier 20, the sample and hold circuit 22 periodically operates, and the analog multiplexer 24 selects a bias (or erase) current. A sample and hold timing is then selected during a period in which a bias control signal is active.

Table 2 illustrates the sampling operation of the sample and hold circuit 22.

TABLE 2

| Number | Method of generating a sample and hold signal | Remarks |
|---|---|---|
| 0 | Output the bias control unchanged | Obtain a necessary magnitude of signal from each generated sample and hold signal and can partially use the obtained magnitude of signal |
| 1 | Perform an AND operation on the bias control and the primary delay signal of the bias control and output the AND operation result | |
| 2 | Perform an AND operation on the bias control and the secondary delay signal of the bias control and output the AND operation result | |
| 3 | Perform an AND operation on the bias control and the tertiary delay signal of the bias control and output the AND operation result | |

FIGS. 5(a)–(h) illustrate waveforms describing the sampling operation of the sample and hold circuit 22 in the LD driver 200 of FIG. 3 according to Table 2. Specifically, FIG. 5(a) illustrates a waveform of an example of inputting NRZI. FIG. 5(b) illustrates a waveform of bias 1 control signal (example of high active). FIG. 5(c) illustrates a waveform of a primary delay signal of bias 1. FIG. 5(d) illustrates a waveform of a secondary delay signal of bias 1. FIG. 5(e) illustrates a waveform of a tertiary delay signal of bias 1. FIG. 5(f) illustrates a waveform of a sampling and holding signal 1 of bias 1. FIG. 5(g) illustrates a waveform of a sampling and holding signal 2 of bias 1. FIG. 5(h) illustrates a waveform of a sampling and holding signal 3 of bias 1.

The sample and hold circuit 22 samples the bias control signal because the bias control signal can be easily sampled since the frequency of the bias control signal is lower than the frequency of the peak control signal or the read control signal. Further, the sample and hold circuit 22 also samples the bias control signal because the amount of change of the bias control signal is less than the amount of change of the peak control signal or the read control signal in an adaptive recording method, in which the width or the rising or falling position of each pulse that forms a multi train according to the length of an adjacent mark-space is shifted and recorded.

The width of the input NRZI data is different from the width of the bias control signal because the pulse width of the bias control signal varies according to a first pulse rising edge and a cooling pulse rising edge (this is also called an adaptive edge control). Also, a time delay unit of a signal obtained by delaying the bias control signal is shown to be the same as the clock period of a recording medium. However, in order to improve sampling precision degree, the time delay unit can be set to be shorter than the clock period of the recording medium. The switch 30 selects the LD to be used according to the selection signal SEL-LD (e.g., an LD of 780 nm of a CD or an LD of 650 nm of a DVD). The process selecting the LD is performed during the initialization of the optical recording and reproduction apparatus.

The HFM 18 generates a high frequency modulation signal having different frequencies and magnitudes according to the type of LD to be used. The operation of the HFM 18 is controlled by the selection signal SEL-LD. Because the LD driver shown in FIG. 3 can control the power of the LD regardless of a run optimal power controller (ROPC), the apparatus may be used separate from the ROPC or may be used in combination with the ROPC. Here, the ROPC for driving current into the LD driver controls current so that Vpp of a reproduction signal is uniform.

Figure 6A:
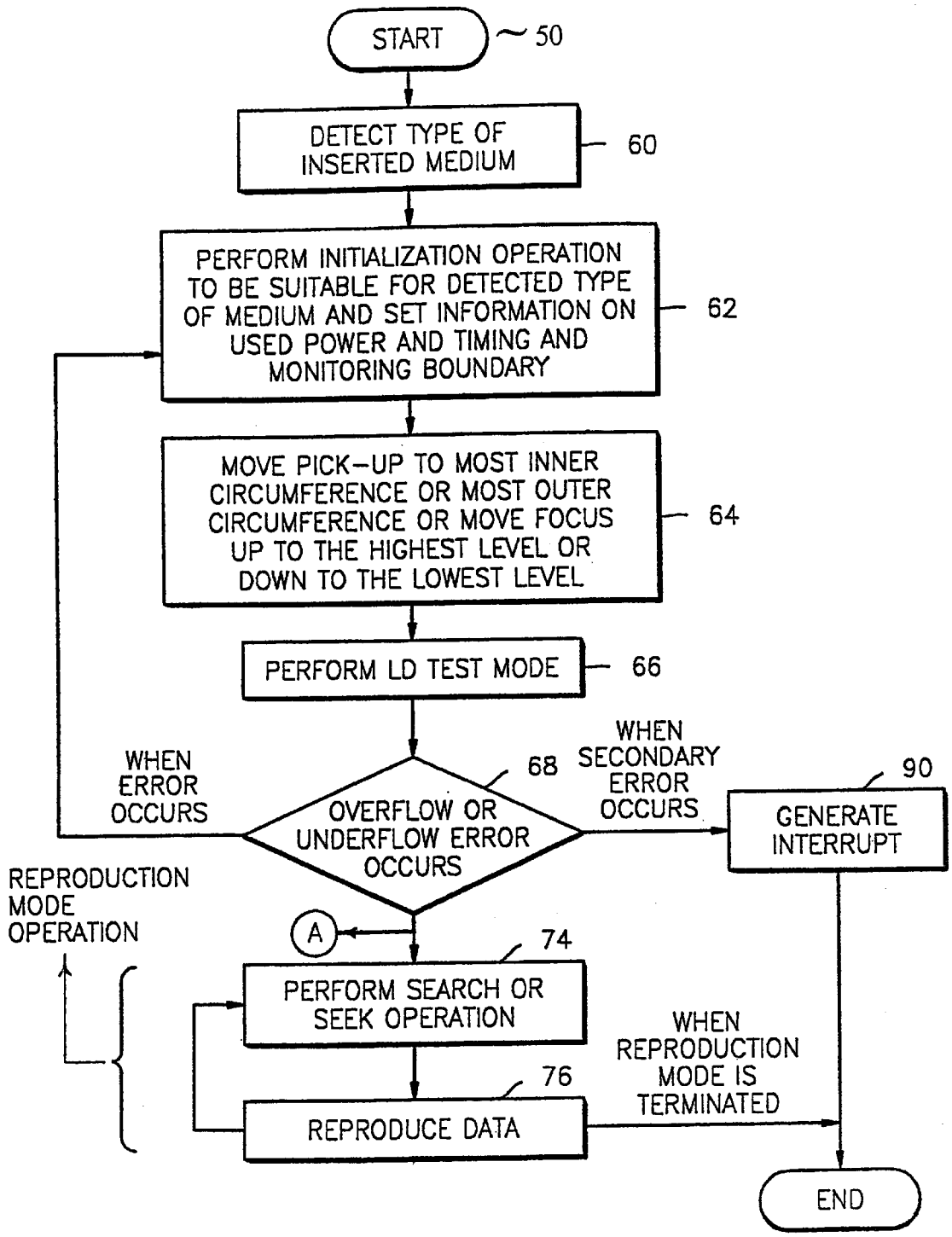
FIG. 6A and FIG. 6B are flowcharts illustrating initializing and driving methods, in accordance with an exemplary embodiment of the present invention.
Figure 6B:
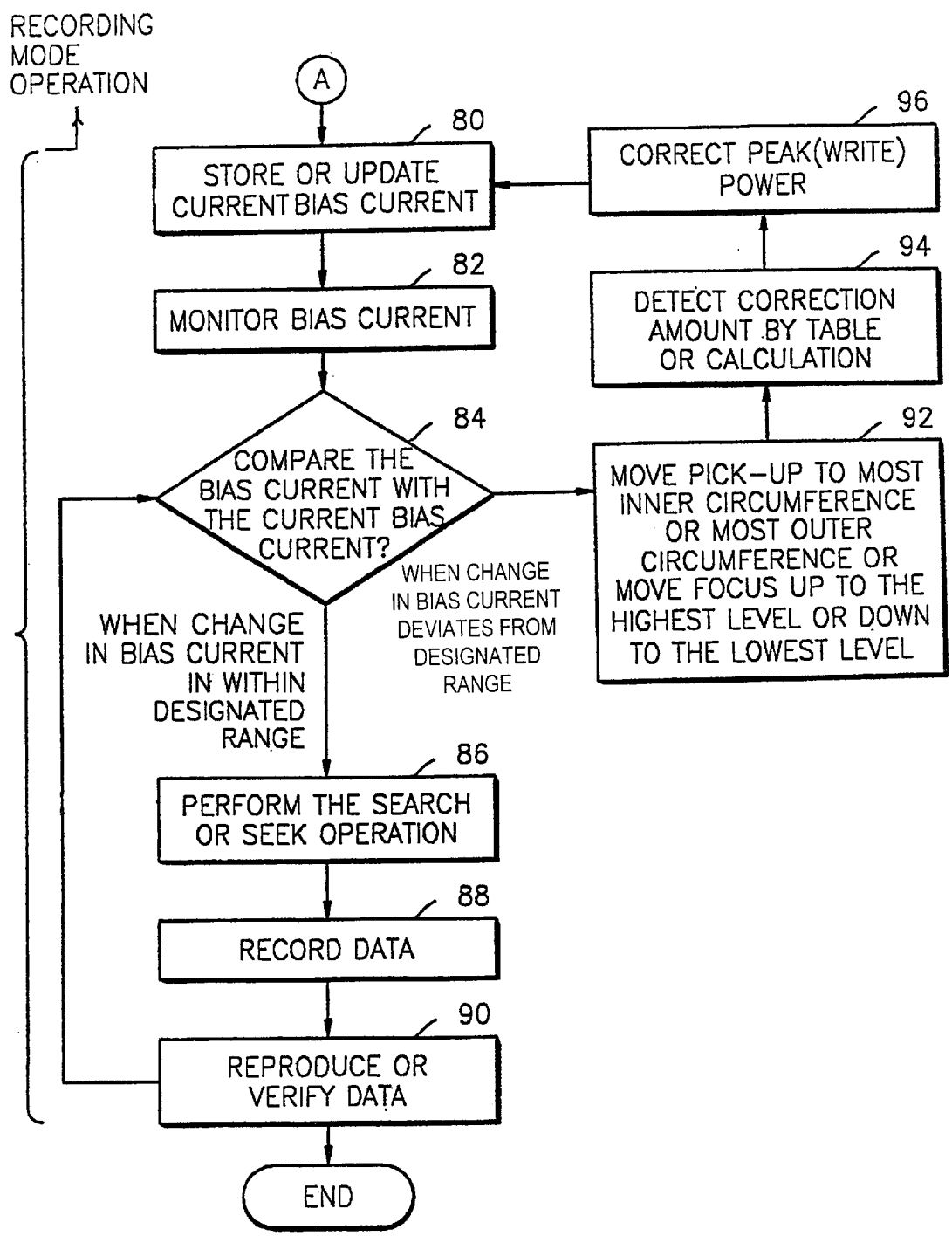

FIG. 6A and FIG. 6B are flowcharts illustrating an initializing method and a driving method in accordance with an exemplary embodiment of the present invention. In FIG. 6A, operations 60 to 68 correspond to the initializing method. In FIGS. 6A and 6B, operations 70 to 96 correspond to the driving method. At operations 70 to 96, the peak power level is corrected or examined when the amount of change in the bias current is more than a predetermined value.

At operation 50, memories are cleared, initial flag conditions are set, etc., as is well known in the art. At operation 60, the type of an inserted recording medium is monitored. Recording medium include a CD, a CD-RW, and a DVD. Because optical reflectivity varies according to the respective recording medium in general, the type of recording medium is determined using the difference in the optical reflectivity.

The initializing method performed at operations 60 to 68 is performed to be suitable for the monitored type of recording medium. Namely, at operation 62, the LD to be used is selected through the selection signal SEL-LD, driving potential and sampling timing information for the sample and hold circuit 22 are set corresponding to the recording medium loaded into the LD driver, and a monitoring boundary is set. The monitoring boundary means a boundary, within which bias driving potential or peak driving potential does not need to be compensated for when the power level of the laser signal output from the LD changes within a certain range.

At operation 64, an optical pick-up is moved to the most inner circumference or the most outer circumference of the recording medium or focus is moved up to the highest level or down to the lowest level. Operation 64 is a preparatory operation for testing the LD. At operation 66, an LD test mode is performed. In the LD test mode, read recording power, erase recording power, and write recording power are output at uniform intervals during the initialization, the respective driving potentials are corrected by monitoring them, and the LD is tested for malfunction. The LD test mode may be used to test the LD during initialization; however, the LD test mode may be selectively performed during the operation. Specifically, the LD test mode may be used for testing or correcting the respective driving potentials.

The LD test mode may affect the information recorded in the recording medium during an LD testing operation. Therefore, in the LD test mode, the recorded information is protected by moving the optical pick-up to the most inner circumference or the most outer circumference of the recording medium or moving the objective lens of the optical pick-up up or down to the highest level through a focus servo (not shown). It is possible to minimize a time for testing the LD by moving up or down the objective lens to the highest level rather than by moving the optical pick-up to the most outer circumference or the most inner circumference.

At operation 68, the initializing method checks whether errors occur. If errors occur, the method returns to operation 62 and the LD is repeatedly tested. If errors continuously occur, an interrupt is generated at operation 70 and the initializing method is terminated. If errors do not occur, the method proceeds to operation 74, when the reproduction mode is determined, or to operation 80, when the recording mode is determined.

At operation 74, a reproduction operation is performed through a search or seek operation. At operation 76, a data reproduction is performed. At operation 80, when the recording mode is determined, the most recent bias current is stored. At operation 82, a most recent bias current is detected. At operation 84, the stored bias current is compared with the most recent bias current and it is determined whether the difference between the stored bias current and the most recent bias current deviates from the monitoring boundary which is set at operation 62.

If the bias current is within the monitoring boundary, then, at operation 86 a search operation or seek operation is performed. At operation 88, the recording mode operation records data and, at operation 90, data is reproduced or verified.

Because LD driver 200 of FIG. 3 performs an auto laser power control (ALPC) operation on the basis of the bias current during a recording or erasing operation as shown in Table 2, the peak power can be compensated, if necessary, by periodically controlling the peak current. Therefore, when the bias current slightly deviates from the monitoring boundary, the amount of peak current compensation errors is negligible. Specifically, when the slopes of the bias current and the monitoring boundary are identical or almost identical to each other, the peak current compensation errors need not be compensated.

When the detected bias current deviates from the monitoring boundary, that is, when the amount of change in the bias current is more than a predetermined value, the peak power is corrected or checked. The monitoring boundary varies according to the LDs. The allowance degree of a search range is higher in a higher output LD.

At operation 84, if the bias current is not within the monitoring boundary, at operation 92, the optical pick-up is moved to the most inner circumference or the most outer circumference of the recording medium or the objective lens is moved up or down to the highest level through focus servo. At operation 94, the amount of correction is calculated according to a previously written look-up table or a predetermined calculation. At operation 96, the peak (write) power is corrected by applying the calculated amount of correction. The recording mode operation proceeds to operation 80 and the bias current is updated.

As mentioned above, according to the LD driver 200 in accordance to the present invention, it is possible to prevent the occurrence of a mis-operation due to electromagnetic wave interference generated during an interface between the LD driver and the ALPC circuit, which are separated from each other like in the conventional technology because the ALPC circuit is loaded into the LD driver.

Also, because a plurality of LDs may be driven by one LD driver, the lower compatibility and share of media occur. According to the initializing method in accordance with the present invention, the LD driver is initialized corresponding to a recording medium in the optical recording and reproduction apparatus for driving a plurality of LDs by one LD driver. According to the method of driving the LD, in accordance to the present invention, the change in the output power of the LD is adaptively compensated.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A laser diode (LD) driver in an optical recording and reproduction apparatus driving an LD by receiving channel control signals to control power levels of a laser signal from the LD, comprising:
   switches turning on and off driving potentials, each switch corresponding to the power level of the laser signal according to the channel control signals;
   a multiplexer multiplexing the driving potentials and outputting a multiplexed signal;
   a monitor diode monitoring the power level of the laser signal and outputting a monitor signal;
   a sample and hold unit sampling and holding the monitor signal and outputting a signal indicative thereof;
   a differential amplifier calculating a difference between a reference signal corresponding to the power level of the laser signal and the output signal from the sample and hold unit; and
   an adder adding the difference and the multiplexed signal and outputting therefrom a driving signal to drive the LD.

2. The LD driver as recited in claim 1, further comprising a gate determining an operating mode of the optical recording and reproduction apparatus according to the channel control signals.

3. The LD driver as recited in claim 2, wherein the operating mode comprises a reproduction mode, a recording and erase mode, and a disable mode.

4. The LD driver as recited in claim 3, further comprising:
   a variable gain amplifier variably amplifying the monitor signal according to the determined operating mode by the gate and providing an amplified monitor signal to the sample and hold unit; and
   an analog multiplexer outputting the reference signal according to the operating mode determined by the gate.

5. The LD driver as recited in claim 2, wherein the analog multiplexer receives a bias power driving potential designating a bias power level of the laser signal from the LD and a read power driving potential designating a read power level of the laser signal and outputs the read power driving potential in the reproduction mode or the bias power driving potential in the recording and erase mode as the reference signal according to the operating mode determined by the gate.

6. The LD driver as recited in claim 5, wherein the sampling of the sample and hold unit is performed in a section, in which a bias control signal is active.

7. The LD driver as recited in claim 5, wherein the sampling of the sample and hold unit is performed in a section, in which a signal obtained by performing a logic AND operation on the bias control signal and a signal obtained by delaying the bias control signal is active.

8. The LD driver as recited in claim 7, further comprising a delay time unit delaying the bias control signal by an amount equal to a clock period of a recording medium.

9. The LD driver as recited in claim 7, further comprising a delay time delaying the bias control signal by an amount less than a clock period of a recording media.

10. The LD driver as recited in claim 2, wherein the gate determines the operating mode to be the recording and erase mode when either an erase control signal or a write control signal is active.

11. The LD driver as recited in claim 10, wherein the gate determines the operating mode to be the reproduction mode when the erase control signal and the write control signal are inactive and a read control signal is active.

12. The LD driver as recited in claim 11, wherein the gate determines the operating mode of the optical recording and reproduction apparatus to be a disable mode, in which the LD is not to be driven, when the read control signal is not active.

13. The LD driver as recited in claim 2, further comprising a switch driven by an LD selection signal to selectively output the driving signal to two or more LDs.

14. The LD driver as recited in claim 13, further comprising a high frequency modulator generating a high frequency modulation signal removing the influence of optical interference noise caused by an optical pick-up and providing the high frequency modulation signal to the adder.

15. The LD driver as recited in claim 13, wherein the high frequency modulation signal comprises different frequencies and magnitudes according to the LD selection signal.

16. The LD driver as recited in claim 1, wherein the driving potentials comprise a peak power driving potential, a bias power driving potential, and a read power driving potential.

17. The LD driver as recited in claim 1, wherein the channel control signals comprise a peak control signal, a bias control signal, and a read control signal.

18. The LD driver as recited in claim 2, wherein the operating mode of the optical recording and reproduction apparatus is provided by a system control unit.

19. A laser diode (LD) driver in an optical recording and reproduction apparatus driving an LD by receiving channel control signals comprising a peak control signal, a bias control signal, and a read control signal to control power levels of a laser signal from the LD, comprising:
a multiplexer multiplexing driving potentials and outputting a multiplexed signal, wherein the driving potentials comprise a peak power driving potential, a bias power driving potential, and a read power driving potential;
a gate determining an operating mode of the optical recording and reproduction apparatus according to the channel control signals, wherein the operating mode comprises a reproduction mode, a recording and erase mode, and a disable mode;
a variable gain amplifier variably amplifying a monitor signal according to the operating mode determined by the gate and outputting an amplified monitor signal;
a sample and hold unit sampling and holding the amplified monitor signal and outputting a signal indicative thereof;
an analog multiplexer outputting a reference signal corresponding to the power level of the laser signal according to the operating mode determined by the gate, wherein the reference signal is a read power driving potential in the reproduction mode or a bias power driving potential in the recording and erase mode;
a differential amplifier calculating a difference between the reference signal and the output signal from the sample and hold unit; and
an adder adding the difference and the multiplexed signal and outputting therefrom a driving signal to drive the LD.

20. The LD driver as recited in claim 1, further comprising a switch driven by an LD selection signal to selectively output the driving signal to two or more LDs.

21. The LD driver as recited in claim 20, further comprising a high frequency modulator generating a high frequency modulation signal removing the influence of optical interference noise caused by an optical pick-up and providing the high frequency modulation signal to the adder.

22. The LD driver as recited in claim 20, wherein the high frequency modulation signal comprises different frequencies and magnitudes according to the LD selection signal.

23. A method of driving an LD, comprising:
receiving channel control signals to control a power level of a laser signal from the LD;
turning on and off driving potentials corresponding to the power level of the laser signal according to the channel control signals;
multiplexing the driving potentials and outputting a multiplexed signal;
monitoring the power level of the laser signal and outputting a monitor signal;
sampling and holding the monitor signal and outputting a signal indicative thereof;
calculating a difference between a reference signal corresponding to the power level of the laser signal and the output signal from the sampling and holding; and
adding the difference and the multiplexed signal and outputting therefrom a driving signal to drive the LD.

24. The method as recited in claim 23, wherein the sampling is performed in a section, in which a bias control signal is active.

25. The method as recited in claim 23, wherein the sampling is performed in a section, in which a signal obtained by performing a logic AND operation on the bias control signal and a signal obtained by delaying the bias control signal is active.

26. The method as recited in claim 23, wherein the determining of the operating mode is determined to be the recording and erase mode when an erase control signal or a write control signal is active.

27. The method as recited in claim 23, wherein the determining of the operating mode is determined to be the reproduction mode when the erase control signal and the write control signal are inactive and a read control signal is active.

28. The method as recited in claim 23, wherein the determining of the operating mode is determined to be a disable mode, in which the LD is not to be driven, when a read control signal is not active.

29. The method as recited in claim 23, further comprising selectively outputting the driving signal to two or more LDs.

30. The method as recited in claim 23, further comprising generating a high frequency modulation signal removing the influence of optical interference noise caused by an optical pick-up and providing the high frequency modulation signal to the adding of the output of the differential.

31. A method of driving an LD by receiving channel control signals comprising a peak control signal, a bias control signal, and a read control signal to control different power levels of a laser signal from the LD, the method comprising:
multiplexing driving potentials and outputting a multiplexed signal, wherein the driving potentials comprise a peak power driving potential, a bias power driving potential, and a read power driving potential;
determining an operating mode according to the channel control signals, wherein the operating mode comprises a reproduction mode, a recording and erase mode, and a disable mode;
variably amplifying a monitor signal according to the determined operating mode and outputting an amplified monitor signal;
sampling and holding the amplified monitor signal and outputting a signal indicative thereof;
receiving a bias power driving potential designating a bias power level of the laser signal;
receiving a read power driving potential designating a read power level of the laser signal;
outputting the read power driving potential in the reproduction mode or the bias power driving potential in the recording and erase mode as the reference signal according to the determining of the operating mode;
calculating a difference between the reference signal and the output signal from the sampling and holding; and
adding the difference and the multiplexed signal and generating therefrom a driving signal to drive the LD.

32. The method as recited in claim 23, further comprising selectively outputting the driving signal to two or more LDs.

33. The method as recited in claim 23, further comprising generating a high frequency modulation signal removing the influence of optical interference noise caused by an optical pick-up and providing the high frequency modulation signal to the adding of the output of the differential.

* * * * *

UNITED STATES PATENT AND TRADEMARK OFFICE
CERTIFICATE OF CORRECTION

PATENT NO. : 6,738,339 B2 Page 1 of 1
DATED : May 18, 2004
INVENTOR(S) : Seo Jin Gyo It is certified that error appears in the above-identified patent and that said Letters Patent is hereby corrected as shown below:

Title page,
Item [75], Inventor, please change "Seo Jin Gyo" to -- Jin Gyo Seo --

Signed and Sealed this

Sixteenth Day of November, 2004

JON W. DUDAS
*Director of the United States Patent and Trademark Office*